US011857089B2

(12) United States Patent
Postrel et al.

(10) Patent No.: US 11,857,089 B2
(45) Date of Patent: Jan. 2, 2024

(54) TODDLER WALKER WITH INTERACTIVE DISPLAY DEVICE HAVING MULTIPLE ADJUSTMENT MODES

(71) Applicants: Richard Postrel, Miami Beach, FL (US); Zallascht Postrel, Miami Beach, FL (US)

(72) Inventors: Richard Postrel, Miami Beach, FL (US); Zallascht Postrel, Miami Beach, FL (US)

(*) Notice: Subject to any disclaimer, the term of this patent is extended or adjusted under 35 U.S.C. 154(b) by 0 days.

(21) Appl. No.: 17/749,885

(22) Filed: May 20, 2022

(65) Prior Publication Data

US 2023/0320497 A1 Oct. 12, 2023

Related U.S. Application Data

(60) Provisional application No. 63/328,438, filed on Apr. 7, 2022.

(51) Int. Cl.
*A47D 13/04* (2006.01)
*F16M 11/16* (2006.01)
(Continued)

(52) U.S. Cl.
CPC ........... *A47D 13/04* (2013.01); *F16M 11/046* (2013.01); *F16M 11/10* (2013.01); *F16M 11/16* (2013.01)

(58) Field of Classification Search
CPC ...... A47D 13/04; F16M 11/10; F16M 11/041; A63H 33/006; B62B 3/1424;
(Continued)

(56) References Cited

U.S. PATENT DOCUMENTS

RE24,817 E * 4/1960 Hogan ...................... A61H 3/04
297/DIG. 4
4,968,047 A * 11/1990 Ferris ..................... B62B 3/1416
248/302
(Continued)

FOREIGN PATENT DOCUMENTS

BR 102015016156 A2 1/2015
CN 201231775 Y * 5/2009 ........... B62B 3/1416
(Continued)

OTHER PUBLICATIONS

"Kids Shopping Cart Wooden Baby Walker Baby Push Learning Walker for Kids Adjustable Handle Height"; https://www.amazon.com/Shopping-Wooden-Walker-Learning-Adjustable/dp/B09MC3BSNW ; retrieved Oct. 6, 2023.*

*Primary Examiner* — Emma K Frick
(74) *Attorney, Agent, or Firm* — Sutton Magidoff Barkume LLP

(57) ABSTRACT

A toddler walker having a body comprising a bottom panel, and a front panel, a rear panel, and a pair of side panels attached to the bottom panel so as to form an open box; at least four wheel assemblies, each comprising a wheel rotatably affixed to the body so that when the wheels rotate the body moves via the wheels along a surface; a handlebar assembly comprising a handlebar, means for adjusting the handlebar to a desired vertical position, and a pair of leg channels pivotally connected to the side panels to enable a toddler to grasp said handlebar assembly when located behind the body and direct movement of the body along the surface; and a display device assembly pivotally connected to the handlebar assembly and comprising means for removably attaching a display device further comprising means for adjusting the height of the display device.

16 Claims, 6 Drawing Sheets

(51) Int. Cl.
*F16M 11/04* (2006.01)
*F16M 11/10* (2006.01)

(58) Field of Classification Search
CPC ... B62B 3/1456; B62B 3/1428; B62B 3/1416; B62B 5/00; B62B 2202/56
See application file for complete search history.

(56) References Cited

U.S. PATENT DOCUMENTS

| | | | | |
|---|---|---|---|---|
| 5,013,032 A * | 5/1991 | Baum | ........ | A47D 13/04 482/68 |
| 5,154,658 A * | 10/1992 | Marcus | ........ | A63H 5/00 446/485 |
| 6,206,384 B1 * | 3/2001 | Chi | ........ | A63H 33/00 280/30 |
| 7,032,980 B2 * | 4/2006 | Herbert | ........ | A47D 13/04 301/64.707 |
| 7,861,991 B1 * | 1/2011 | Sylvertooth-Jackson | ........ | A47B 23/00 248/274.1 |
| 8,020,829 B1 * | 9/2011 | Tamayori | ........ | F16M 13/00 108/144.11 |
| 8,205,561 B1 | 6/2012 | Bierworth | | |
| 8,978,947 B1 * | 3/2015 | Schneidau | ........ | B60R 11/02 280/47.38 |
| 9,145,158 B2 * | 9/2015 | Cruz | ........ | A47C 7/723 |
| 9,278,042 B2 | 3/2016 | Osterhaus | | |
| 9,316,502 B2 | 4/2016 | Moore et al. | | |
| 9,650,061 B2 * | 5/2017 | Katayama | ........ | A61H 3/04 |
| 9,656,682 B2 * | 5/2017 | Ahlemeier | ........ | B62B 9/08 |
| 9,701,329 B2 * | 7/2017 | Johnson | ........ | B62B 3/001 |
| 9,969,415 B2 * | 5/2018 | Chen | ........ | B62B 3/1492 |
| 10,081,382 B1 * | 9/2018 | Alton | ........ | F16M 11/40 |
| 10,086,859 B2 * | 10/2018 | Chen | ........ | B62B 3/1404 |
| 10,214,231 B2 * | 2/2019 | Chen | ........ | B60L 53/16 |
| 10,383,456 B1 * | 8/2019 | Gyasi | ........ | A47D 13/04 |
| 10,813,451 B2 * | 10/2020 | Hill | ........ | F16M 11/10 |
| 10,913,476 B1 * | 2/2021 | Alyaqout | ........ | B62B 3/142 |
| 11,004,053 B2 * | 5/2021 | Cheng | ........ | G07G 1/009 |
| 11,155,290 B2 * | 10/2021 | Yokoyama | ........ | B62B 3/1424 |
| 11,161,538 B2 * | 11/2021 | McLean | ........ | H01M 50/247 |
| D961,577 S * | 8/2022 | Griego | ........ | D12/133 |
| 11,447,168 B1 * | 9/2022 | Ferrer | ........ | B62B 9/20 |
| 11,577,769 B2 * | 2/2023 | Ting | ........ | H01M 10/0525 |
| 11,667,315 B1 * | 6/2023 | Ventola | ........ | B62B 7/12 280/638 |
| 2004/0007651 A1 * | 1/2004 | Williams | ........ | F16M 13/00 248/346.06 |
| 2004/0031900 A1 | 2/2004 | Chang | | |
| 2004/0150180 A1 | 8/2004 | Fish, Jr. et al. | | |
| 2004/0259070 A1 * | 12/2004 | Goodstein | ........ | A63H 33/006 434/428 |
| 2005/0035198 A1 * | 2/2005 | Wilensky | ........ | B62B 3/1424 235/383 |
| 2006/0007191 A1 * | 1/2006 | Chi | ........ | B62B 3/1424 345/184 |
| 2006/0012138 A1 * | 1/2006 | Otterlee | ........ | B62B 3/1424 280/33.993 |
| 2006/0113342 A1 * | 6/2006 | Hampton | ........ | B62B 9/26 224/42.33 |
| 2014/0091193 A1 * | 4/2014 | Simon | ........ | F16M 13/00 248/458 |
| 2014/0124553 A1 * | 5/2014 | Cruz | ........ | B62B 9/245 224/409 |
| 2014/0125020 A1 * | 5/2014 | Sime | ........ | B62B 9/12 280/47.38 |
| 2015/0108317 A1 | 4/2015 | Cruz | | |
| 2017/0072980 A1 * | 3/2017 | Wang | ........ | B62B 7/06 |
| 2017/0361857 A1 * | 12/2017 | Chen | ........ | B62B 3/1476 |
| 2019/0262217 A1 * | 8/2019 | Kanaya | ........ | A63B 21/4045 |
| 2020/0336581 A1 * | 10/2020 | Allen | ........ | F16M 11/16 |
| 2021/0228433 A1 | 7/2021 | Landry et al. | | |

FOREIGN PATENT DOCUMENTS

| | | | | |
|---|---|---|---|---|
| CN | 201882122 U * | 6/2011 | ........ | B62B 3/1412 |
| CN | 206344840 U * | 7/2017 | | |
| DE | 102010023704 A1 * | 12/2011 | ........ | B62B 3/1404 |
| WO | WO-2021074835 A1 * | 4/2021 | ........ | B62B 3/106 |

* cited by examiner

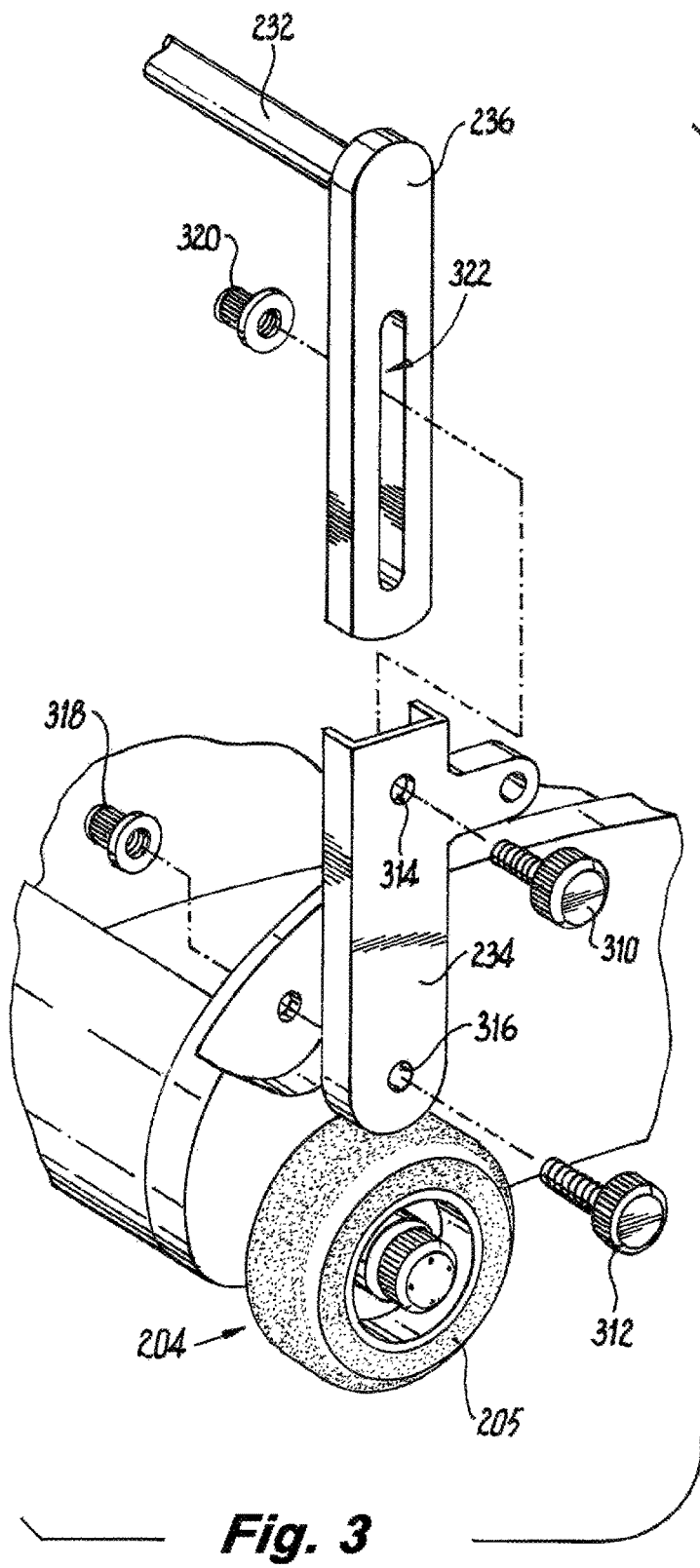
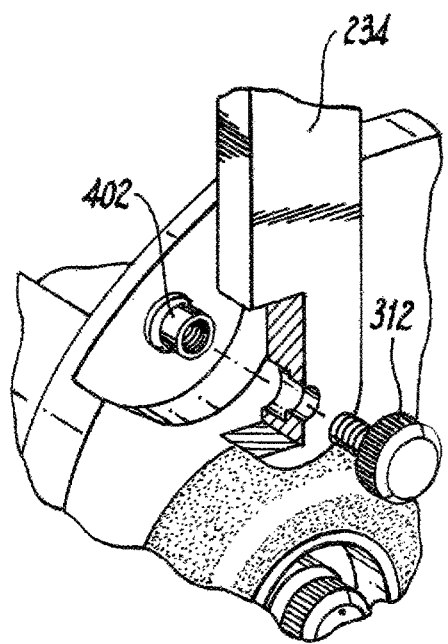
Fig. 3
Fig. 4

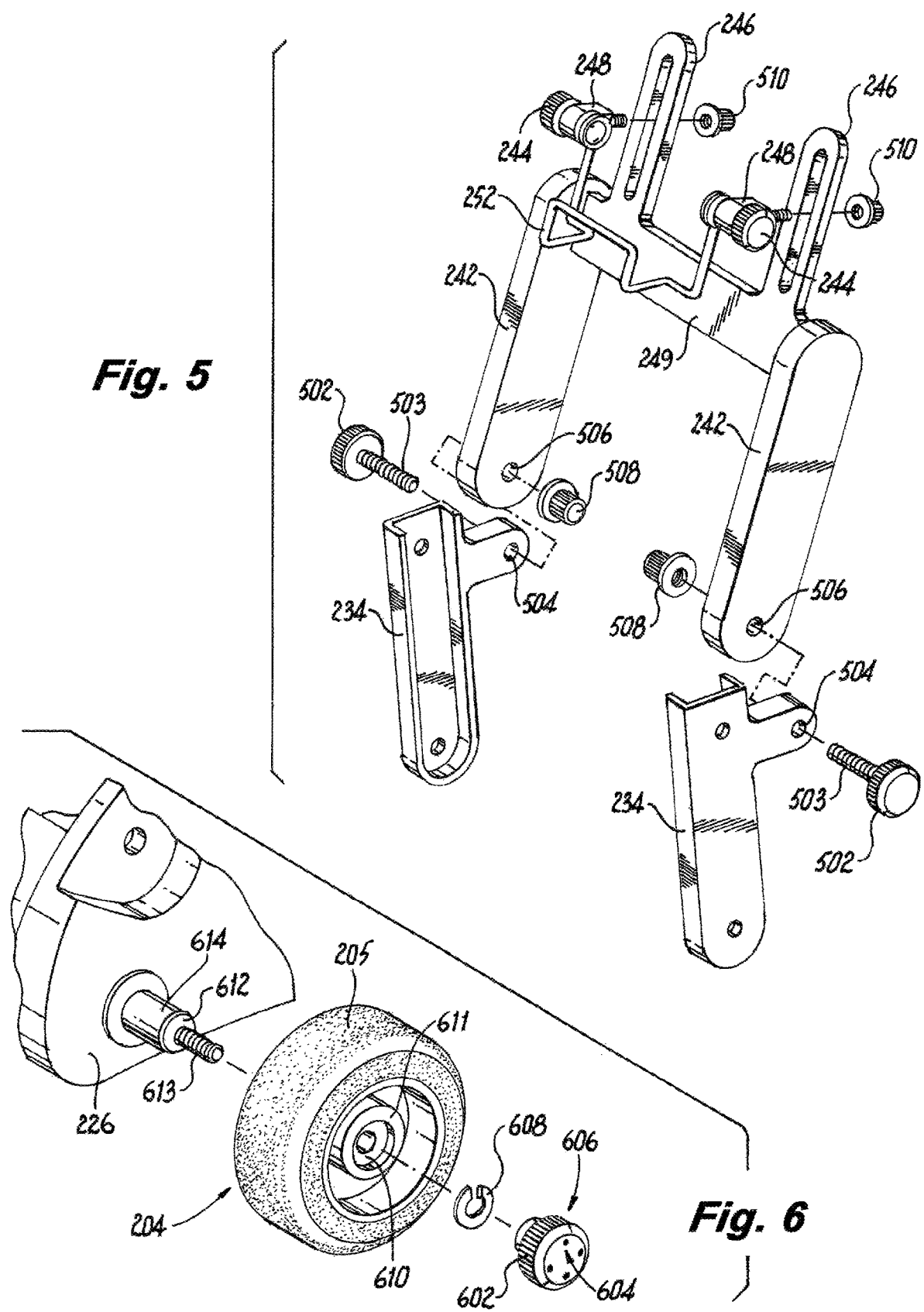

TODDLER WALKER WITH INTERACTIVE DISPLAY DEVICE HAVING MULTIPLE ADJUSTMENT MODES

TECHNICAL FIELD

This application relates to a device that assists a toddler in learning to walk, and in particular to such a device having an interactive display device, wherein multiple adjustment modes are provided for increased suitability to the particular stage of development in which the toddler is learning to walk.

BACKGROUND OF THE INVENTION

Devices exist which assist toddlers (e.g., 1-2 year olds) in learning to walk. These devices, referred to herein as toddler walkers, may exist in different forms, but in general include a body and four wheels, and a handle suitable for the toddler to hold onto while he or she begins to walk. The walker provides a stable vehicle that the toddler can lean on as they take their first steps, eventually enabling the toddler to gain the balance, strength, and confidence to walk on their own without relying on the walker.

These existing walkers do not, however, account for differences in size, strength, or dexterity of the toddler, or where they may be on the developmental curve with respect to learning to walk unassisted. For example, a toddler who is just starting to learn to walk has different needs than one who is close to walking unassisted. The prior art walkers may either be too difficult for a beginning walker, and/or too easy for a more experienced walker. Additionally, these walkers lack the ability to provide engagement of the toddler with the walker through, e.g., an interactive display device or the like.

SUMMARY OF THE INVENTION

Provided herein is a toddler walker, which in a first embodiment includes a body which has a bottom panel, and a front panel, rear panel, and two side panels attached to the bottom panel so as to form an open box. At least four wheel assemblies are provided, each including a wheel rotatably affixed to the body so that when the wheels rotate the body moves via the wheels along a surface. A handlebar assembly is provided with a handlebar, means for adjusting the handlebar to a desired vertical position, and a pair of leg channels pivotally connected to the side panels, to enable a toddler to grasp the handlebar assembly when located behind the body and direct movement of the body along the surface.

A display device assembly is pivotally connected to the handlebar assembly and has means for removably attaching a display device for display to the toddler as they direct movement of the walker along the surface, including means for adjusting the height of the display device.

Each wheel assembly of the toddler walker includes a hub having a hub recess centered therein. The wheel of each wheel assembly is rotatably affixed to the body with an axle attached to the side panel, wherein the axle has a threaded portion. The wheel is coupled to the axle by inserting the threaded portion of the axle through the hub recess such that the hub rests against a bearing surface of the axle. A knob is threaded onto the threaded portion of the axle to maintain the wheel rotatably on the axle.

Each wheel assembly may also include means for adjusting the tension of the wheel such that the wheel may be set to require a desired amount of strength to push the walker along the surface. For example, the means for adjusting the tension of the wheel may include a lock washer inserted onto the threaded portion of the axle between the hub and the knob, wherein the lock washer provides biasing so that tightening the knob urges the lock washer against the hub to increase friction against the hub and require increased strength to push the walker along the surface. The wheel assembly may also have a label including graphics indicating the position of the knob with respect to the wheel, thus enabling each wheel to be easily set to the same tension as the others.

Each leg channel of the handlebar assembly is slidingly connected to a slotted member, with the handlebar being connected at each end to the slotted members. The means for adjusting the handlebar to a desired vertical position may include a bolt inserted through an aperture on the leg channel and a slot in the slotted member, with a nut attaching to the bolt to hold the slotted member in sliding relation to the leg channel. Loosening the nut from the bolt allows the slotted member to be raised or lowered in relation to the leg channel and tightening the nut to the bolt retains the slotted member with respect to the leg channel.

In one aspect, the handlebar assembly is pivotally connected to the side panels with a bolt inserted through an aperture in each leg channel and a mating aperture in the side panel. A nut attaches to each bolt to hold each leg channel in pivoting relation to the side panel. Loosening the nut from the bolt allows the leg channel to be pivoted in relation to the side panel to a desired angular position and tightening the nut to the bolt retains the leg channel with respect to the side panel.

Alternately, the handlebar assembly is pivotally connected to the side panels with a bolt inserted through an aperture in the leg channel and threaded into a tapped insert affixed in the side panel. Loosening the bolt from the tapped insert allows the leg channel to be pivoted in relation to the side panel to a desired angular position and tightening the bolt to the tapped insert retains the leg channel with respect to the side panel The display device assembly may include a crossbar connected at each end to one of a pair of legs, wherein each of the legs is pivotally connected to the handlebar assembly with a bolt inserted through an aperture in each leg channel of the handlebar assembly and a mating aperture in each leg. A nut attaches to each bolt to hold each leg in pivoting relation to the leg channel. Loosening the nut from the bolt allows the leg to be pivoted in relation to the leg channel to a desired angular position and tightening the nut to the bolt retains the leg with respect to leg channel.

The means for removably attaching a display device for display to the toddler as they direct movement of the walker along the surface may include a device bracket for removably holding the display device. The device bracket has a pair of threaded device mounts oppositely disposed to removably hold the display device, and a pair of locking knobs, each of the locking knobs threadedly engaging each threaded mount whereby the position of each of the threaded mounts can be selectively adjusted to accommodate differently sized display devices.

The means for adjusting the height of the display device may include a pair of nuts for removably securing each of the threaded mounts to the crossbar through a slotted upright attached to the crossbar. The device bracket may be raised or lowered in relation to the crossbar and the nuts may be used to secure the device bracket in a desired vertical position on the crossbar.

In a second embodiment, the toddler walker is similar to the first embodiment and includes a body which has a bottom panel, and a front panel, rear panel, and two side panels attached to the bottom panel so as to form an open box. At least four wheel assemblies are provided, each including a wheel rotatably affixed to the body so that when the wheels rotate the body moves via the wheels along a surface. A handlebar assembly is provided with a handlebar, means for adjusting the handlebar to a desired vertical position, and a pair of leg channels pivotally connected to the side panels, to enable a toddler to grasp the handlebar assembly when located behind the body and direct movement of the body along the surface.

However, in this second embodiment, the display device assembly is slidingly connected to the side panels and has means for removably attaching a display device for display to the toddler as they direct movement of the walker along the surface, including means for adjusting the height of the display device. Each side panel has a slotted bracket with a slot for receiving therethrough a mount with a threaded stud, wherein a nut is threaded onto the threaded stud to secure the mount to the slotted bracket.

Also, in this second embodiment, the display device assembly has a crossbar attached at each end to one of a pair of legs, wherein each of the legs is pivotally connected to the side panels with a bolt inserted through an aperture in each leg and a mating aperture in the mount secured to the side panel. The bolt is secured with a nut and holds each leg in pivoting relation to the mount. Loosening the nut from the bolt allows the leg to be pivoted in relation to the mount to a desired angular position and tightening the nut to the bolt retains the leg with respect to the mount.

In this second embodiment, the display device assembly has means for pivoting the crossbar in relation to the legs, which may include a bolt inserted into an aperture in the crossbar and a mating aperture in the leg, the bolt being secured by a nut. The crossbar may be pivoted in relation to the legs to provide the desired angular position of the display device.

In a third embodiment, the toddler walker is similar to the first and second embodiments, and has a body which has a bottom panel, and a front panel, rear panel, and two side panels attached to the bottom panel so as to form an open box. At least four wheel assemblies are provided, each including a wheel rotatably affixed to the body so that when the wheels rotate the body moves via the wheels along a surface. A handlebar assembly is provided with a handlebar, means for adjusting the handlebar to a desired vertical position, and a pair of legs slidingly and pivotally connected to the side panels to enable a toddler to grasp said handlebar assembly when located behind the body and direct movement of the body along the surface.

In this third embodiment, the display device assembly is slidingly connected to the side panels and has means for removably attaching a display device for display to the toddler as they direct movement of the walker along the surface, including means for adjusting the height of the display device.

Furthermore, in this third embodiment, each side panel has a slotted rail with a slot for receiving therethrough a mount with a threaded stud, wherein a nut is threaded onto the threaded stud to secure the mount where desired along the slotted rail. A pair of legs are slidingly and pivotally connected to the side panels with a bolt having a threaded portion inserted through an aperture in each leg and a mating aperture in each mount, the threaded portion of the bolt being secured with a nut. Thus, the leg pivots in relation to the mount and the mount slides in relation to the slotted rail.

Notably, the entertainment and attention getting factor provided by the child's favorite video program presentation on the display device including familiar music, characters and learning animation is the key factor in increasing attention and commitment to by the child to working with the device.

BRIEF DESCRIPTION OF THE DRAWING

FIG. 3 is an enlarged local perspective view of the handlebar support members of the first embodiment of FIG. 1 in a parts-separated condition.

FIG. 4 is a local perspective view of the first embodiment of FIG. 1 with parts separated of an alternate fixturing means for the handlebar support members showing a tapped receiver.

FIG. 5 is a top perspective view with parts separated of the display device support members of the first embodiment of FIG. 1.

FIG. 6 is a local perspective view with parts separated showing the components for tensioning the wheels in the first embodiment of FIG. 1.

DETAILED DESCRIPTION OF THE INVENTION

Figure 1:
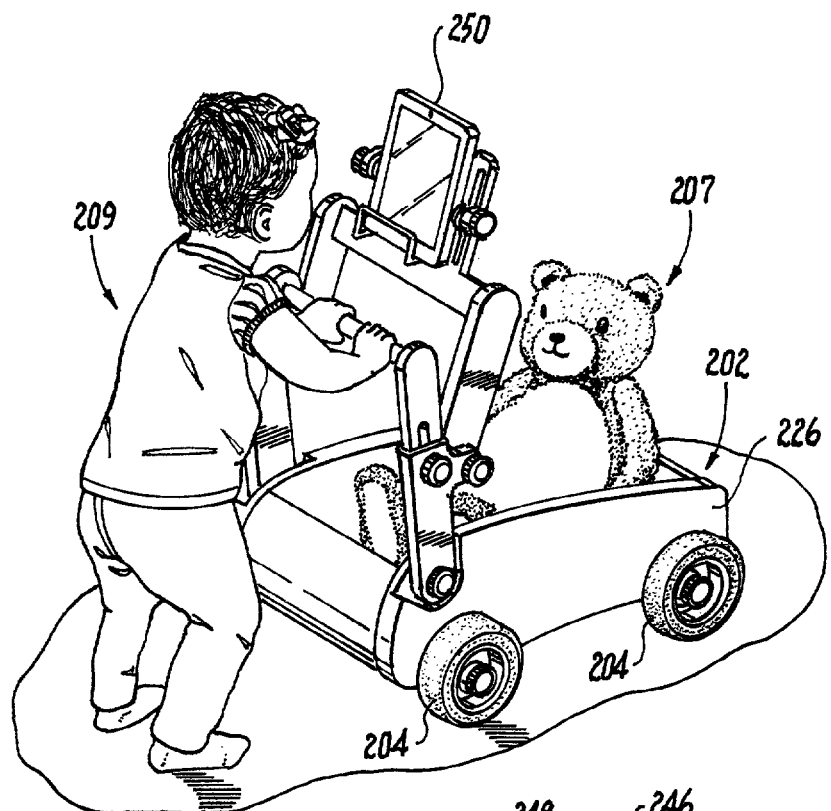
FIG. 1 is a top perspective view of a first embodiment of a toddler walker with a toddler grasping the handlebar while simultaneously viewing media displayed on a display device mounted thereon.
Figure 2:
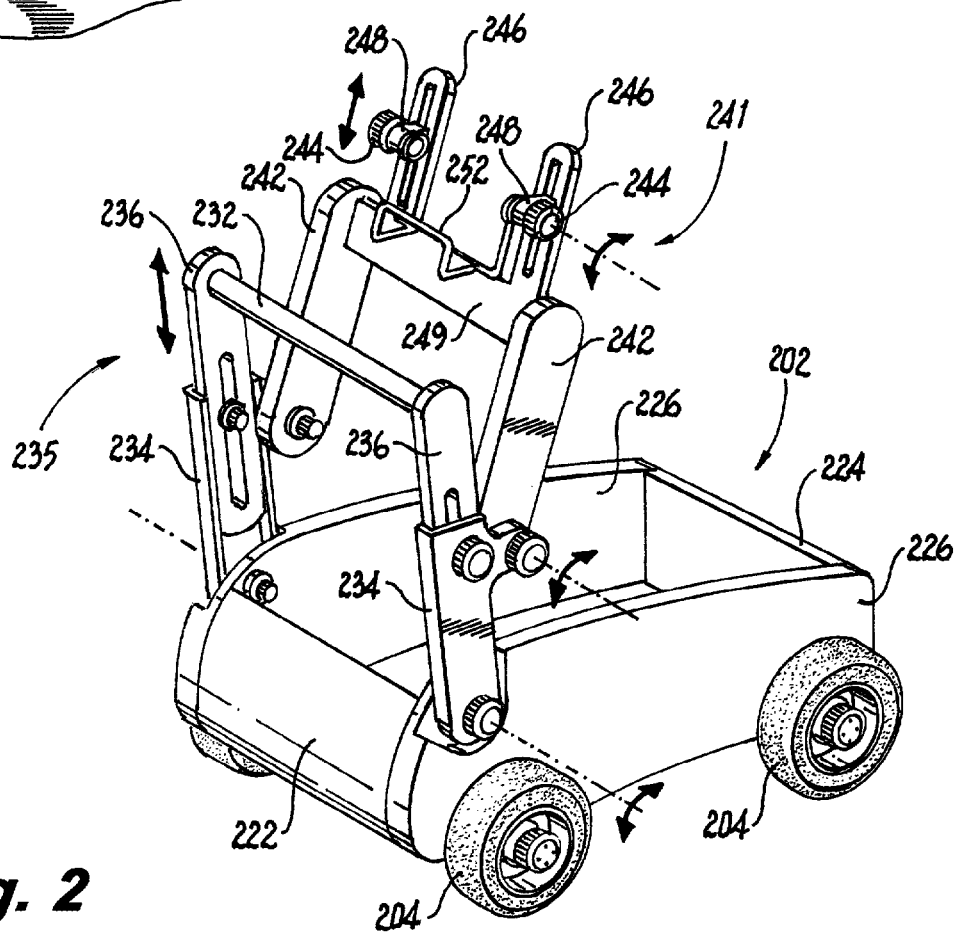
FIG. 2 is a top perspective of the embodiment of FIG. 1, showing the independent adjustability for rotation and length of the handlebar mount, and rotation and height for the display device bracket.

As described herein, FIG. 1 is a top perspective view of a first embodiment of a toddler walker with a toddler grasping a handlebar while simultaneously viewing media displayed on a display device mounted thereon, and FIG. 2 is a top perspective of the embodiment of FIG. 1, showing the independent adjustability for rotation and length of the handlebar assembly, and rotation and height for the display device assembly, as now described in further detail.

The first embodiment of the toddler walker as shown in FIGS. 1 and 2 includes a body 202 which has a bottom panel (not shown), and a front panel 224, a rear panel 222, and two side panels 226 attached to the bottom panel so as to form an open box-like structure. This enables a toddler 209 that is using the toddler walker to carry items such as toys 207 in the walker. At least four wheel assemblies 204 are provided, which as further shown in FIGS. 3 and 6 each including a wheel 205 rotatably affixed to the body 202 so that when the wheels 205 rotate the body 202 moves via the wheels along a surface.

A handlebar assembly 235 is provided with a handlebar 232 and a pair of leg channels 234 pivotally connected to the side panels, to enable the toddler 209 to grasp the handlebar assembly 235 when located behind the body 202 and direct movement of the body along the surface.

Means are also provided for adjusting the handlebar 232 to a desired vertical position, wherein the leg channels 234 are each slidingly connected to a slotted member 236, with the handlebar 232 being connected at each end to the slotted members 236. As shown further in FIG. 3, the means for adjusting the handlebar to a desired vertical position include a bolt 310 inserted through an aperture 314 on the leg channel 234 and a slot 322 in the slotted member 236, with a nut 320 attaching to the bolt 310 to hold the slotted member 236 in sliding relation to the leg channel 234. Loosening the nut 320 from the bolt 310 allows the slotted member 236 to be raised or lowered in relation to the leg channel 234 and tightening the nut 320 to the bolt 310 retains the slotted member 236 with respect to the leg channel 234.

Referring again to FIG. 2, a display device assembly 241 is pivotally connected to the handlebar assembly 235 and has means for removably attaching a display device 250 for display to the toddler 209 as they direct movement of the walker along the surface.

FIG. 6 is a local perspective view with parts separated showing the components for tensioning the wheels in the first embodiment of FIG. 1. Each wheel assembly 204 includes a hub 611 having a hub recess 610 centered therein. The wheel 205 of each wheel assembly 204 is rotatably affixed to the body 202 with an axle 614 attached to the side panel 226. The axle 614 includes a threaded portion 613. The wheel 205 is coupled to the axle 614 by inserting the threaded portion 613 of the axle through the hub recess 610 such that the hub 611 rests against a bearing surface 612 of the axle. A knob assembly 606 including a knob 602 is threaded onto the threaded portion 613 of the axle 614 to maintain the wheel 205 rotatably on the axle.

Each wheel assembly 204 may also include means for adjusting the tension of the wheel such that the wheel may be set to require a desired amount of strength to push the walker along the surface. For example, the means for adjusting the tension of the wheel may include a lock washer 608 inserted onto the threaded portion 613 of the axle between the hub 611 and the knob 602, wherein the lock washer 608 provides biasing so that tightening the knob 602 urges the lock washer 608 against the hub 611 to increase friction against the hub and require increased strength of the toddler to push the walker along the surface. The wheel assembly 204 may also have a label 604 including graphics indicating the position of the knob with respect to the wheel, thus enabling each wheel to be easily set to the same tension as the others.

Referring back to FIGS. 2 and 3, in one aspect, the handlebar assembly 235 is pivotally connected to the side panels 226 with a bolt 312 inserted through an aperture 316 in each leg channel and a mating aperture in the side panel 226. A nut 318 attaches to each bolt 312 to hold each leg channel 234 in pivoting relation to the side panel 226.

Loosening the nut 318 from the bolt 312 allows the leg channel 234 to be pivoted in relation to the side panel 226 to a desired angular position and tightening the nut 318 to the bolt 312 retains the leg channel 234 with respect to the side panel 226.

Alternately, with reference now to FIG. 4, the handlebar assembly 235 is pivotally connected to the side panels 226 with a bolt 312 inserted through an aperture in the leg channel 234 and threaded into a tapped insert 402 affixed in the side panel 226. Loosening the bolt 312 from the tapped insert 402 allows the leg channel 234 to be pivoted in relation to the side panel 226 to a desired angular position and tightening the bolt 312 to the tapped insert 402 retains the leg channel 234 with respect to the side panel 226.

With reference to FIGS. 2 and 5, the display device assembly 241 may include a crossbar 249 connected at each end to one of a pair of legs 242, wherein each of the legs 242 is pivotally connected to the handlebar assembly 235 with a bolt 502 having threads 503 inserted through an aperture 504 in each leg channel 234 of the handlebar assembly 235 and a mating aperture 506 in each leg 242. A nut 508 attaches to each bolt 502 to hold each leg 242 in pivoting relation to the leg channel 234. Loosening the nut 508 from the bolt 502 allows the leg 242 to be pivoted in relation to the leg channel 234 to a desired angular position and tightening the nut 508 to the bolt 502 retains the leg 242 with respect to leg channel 234.

Means for removably attaching a display device 250 for display to the toddler 209 as they direct movement of the walker along the surface may include a device bracket 252 for removably holding the display device 250. The device bracket 252 has a pair of threaded device mounts 248 oppositely disposed to removably hold the display device 250, and a pair of locking knobs 244. Each of the locking knobs 244 threadedly engage each threaded mount 248 such that the position of each of the threaded mounts 248 can be selectively adjusted to accommodate differently sized display devices by moving towards or away from each other as desired.

Means for adjusting the height of the display device 250 may include a pair of nuts 510 for removably securing each of the threaded mounts 248 to the crossbar 249 through a slotted upright 246 attached to the crossbar. The device bracket 252 may be raised or lowered in relation to the crossbar 249 and the nuts 510 may be used to secure the device bracket 252 in a desired vertical position on the crossbar 249.

Figure 7:
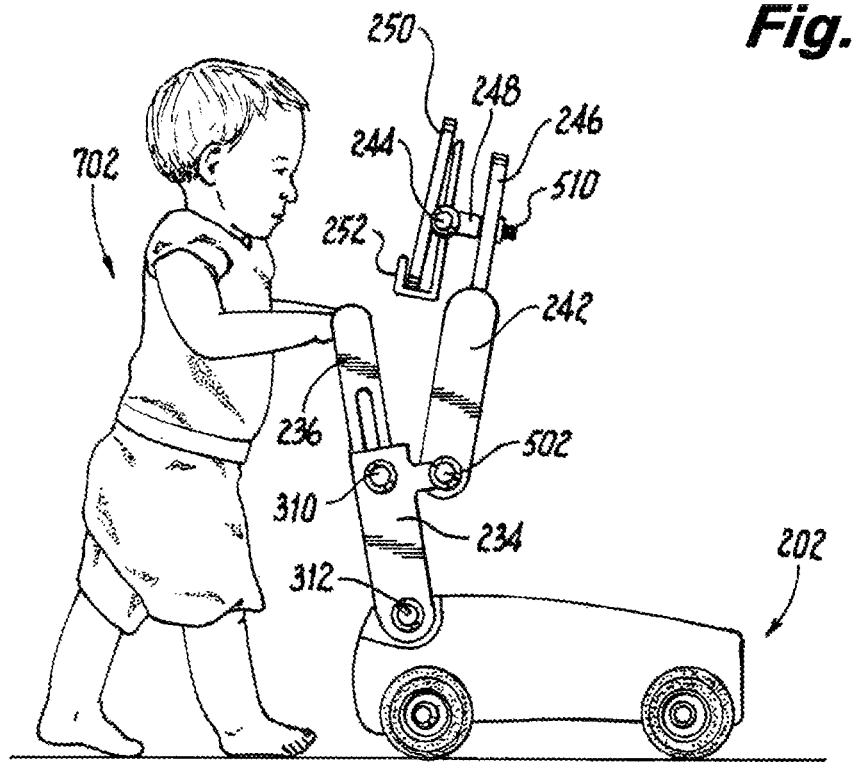
FIG. 7 is a side elevation of the toddler walker of FIG. 1 adjusted for use by a toddler having a smaller stature.
Figure 8:
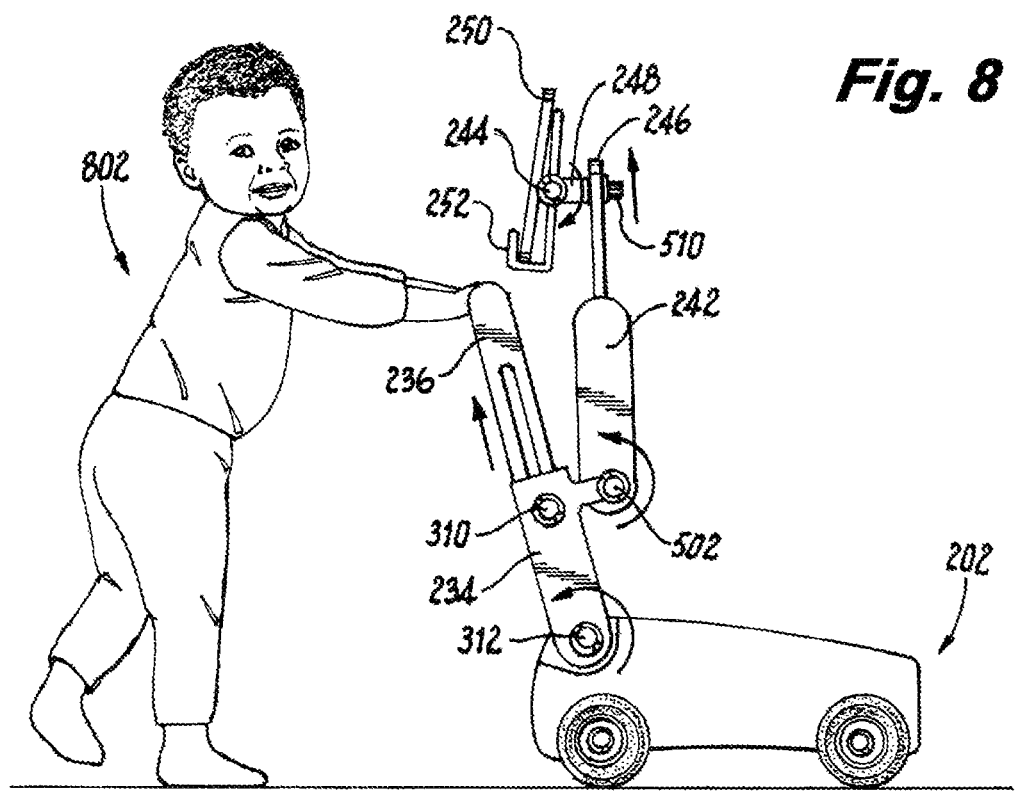
FIG. 8 is a side elevation of the toddler walker of FIG. 1 adjusted for use by a toddler having a larger stature.

By providing the various adjustments described above, the toddler walker can easily accommodate differently aged and sized toddlers, thus extending the useful life of the toddler walker as the toddler grows older, until the point where they no longer need or want to use the toddler walker. Thus, FIG. 7 is a side elevation of the toddler walker adjusted for use by a toddler 702 having a smaller stature; and FIG. 8 is a side elevation of the toddler walker adjusted for use by a toddler 802 having a larger stature.

Figure 9:
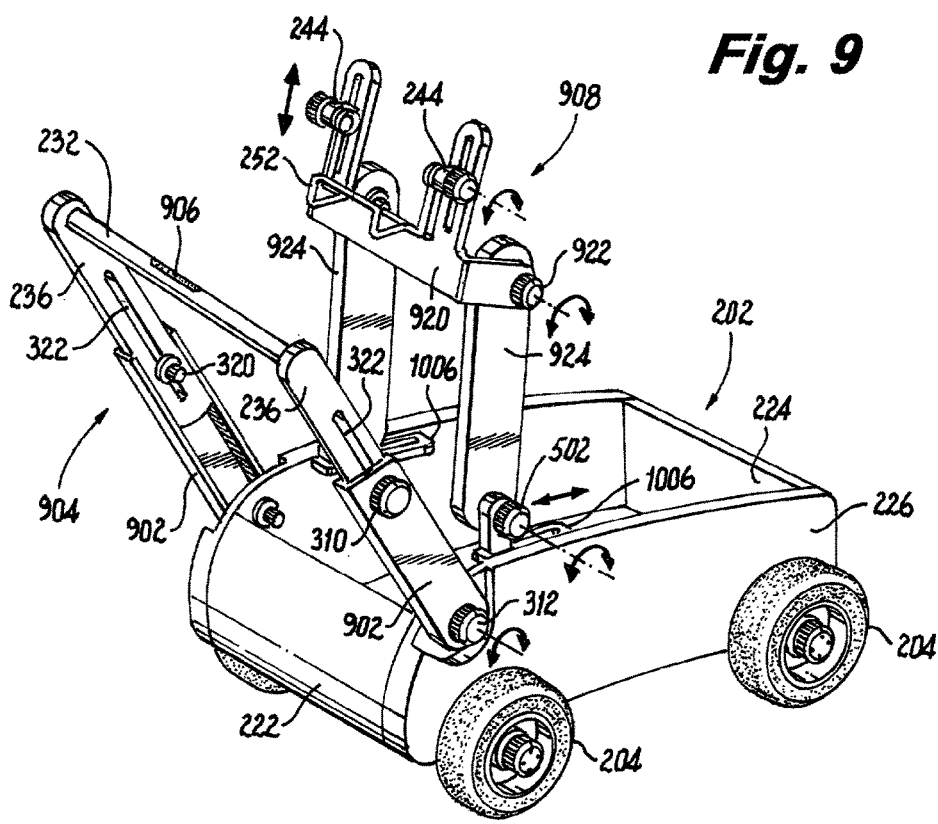
FIG. 9 is a top perspective view of a second embodiment of a toddler walker having a display device mounting which is independent of the handlebar mounting and is slidably adjustable.

FIG. 9 is a top perspective view of a second embodiment of a toddler walker that is similar to the first embodiment described above, the main difference being a modified display device assembly 908 that is independent of a modified handlebar assembly 904 and is slidably adjustable, rather than being pivotally connected to the connected to the handlebar assembly as in the first embodiment.

Thus, as with the first embodiment, the toddler walker includes a body 202 which has a bottom panel (not shown), and a front panel 224, a rear panel 222, and two side panels 226 attached to the bottom panel so as to form an open box-like structure. At least four wheel assemblies 204 are provided, each including a wheel 205 rotatably affixed to the body 202 so that when the wheels 205 rotate the body 202 moves via the wheels along a surface.

A modified handlebar assembly 904 is provided in this second embodiment with a handlebar 232 and a pair of modified leg channels 902 pivotally connected to the side panels 226, to enable a toddler to grasp the handlebar assembly 904 when located behind the body 202 and direct movement of the body along the surface. Also shown is a horn 906, which may be electrical (battery powered) or mechanical as known in the art. The horn 906 may be used with any of the embodiments described herein.

As with the first embodiment, means are provided for adjusting the handlebar 232 to a desired vertical position, wherein the leg channels 902 are each slidingly connected to a slotted member 236, with the handlebar 232 being connected at each end to the slotted members 236. The means for adjusting the handlebar to a desired vertical position include a bolt 310 inserted through an aperture (not shown) on the leg channel 902 and a slot 322 in the slotted member 236, with a nut 320 attaching to the bolt 310 to hold the slotted member 236 in sliding relation to the leg channel 234. Loosening the nut 320 from the bolt 310 allows the slotted member 236 to be raised or lowered in relation to the leg channel 234 and tightening the nut 320 to the bolt 310 retains the slotted member 236 with respect to the leg channel 234.

Figure 10:
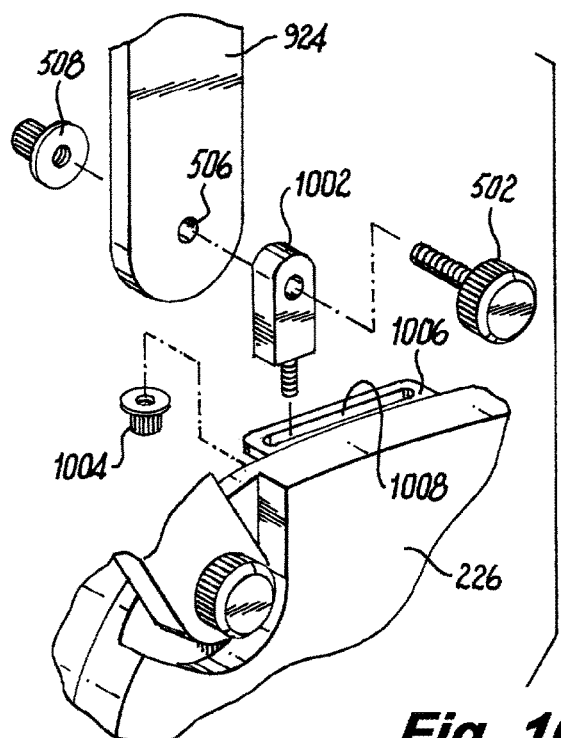
FIG. 10 is a local perspective view of the second embodiment of FIG. 9 with parts separated of the components of the display device mount.

As stated above, in this second embodiment, the modified display device assembly 908 is slidingly connected to the side panels 226 and has means for removably attaching a display device 250 for display to the toddler 209 as they direct movement of the walker along the surface. As shown further in FIG. 10, each side panel 26 has a slotted bracket 1006 with a slot 1008 for receiving therethrough a mount 1002 with a threaded stud, wherein a nut 1004 is threaded onto the threaded stud to secure the mount 1002 to the slotted bracket.

Also, in this second embodiment, the display device assembly 908 has a pivoting crossbar 920 attached at each end to one of a pair of legs 924, wherein each of the legs 924 is pivotally connected to the side panels with a bolt 502 inserted through an aperture 506 in each leg 924 and a mating aperture in the mount 1002 secured to the side panel 226. The bolt 502 is secured with a nut 508 and holds each leg 924 in pivoting relation to the mount 1002. Loosening the nut 508 from the bolt 502 allows the leg 924 to be pivoted in relation to the mount 1002 to a desired angular position and tightening the nut 508 to the bolt 502 retains the leg 924 with respect to the mount 1002.

Figure 11:
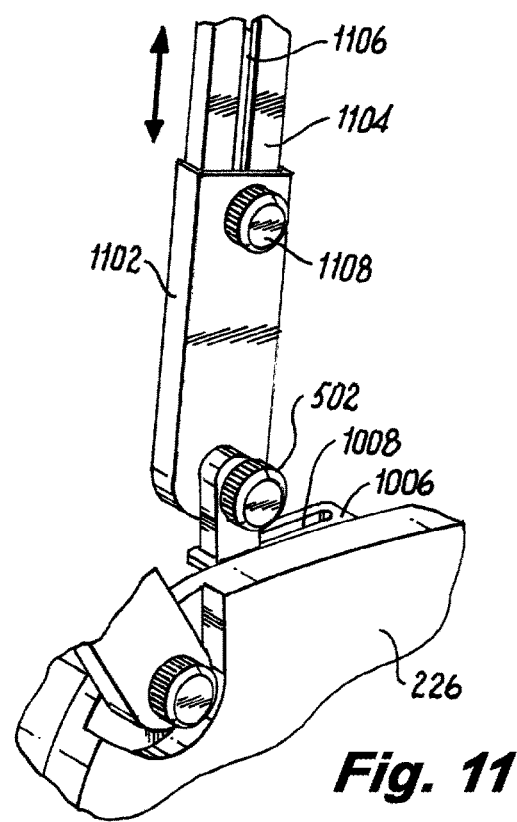
FIG. 11 is a local perspective view of the second embodiment of FIG. 9 showing a display device mount having height adjustability in addition to sliding capability.

In an alternative aspect of this embodiment, FIG. 11 is a local perspective view of the second embodiment of FIG. 9 showing a display device mount having height adjustability in addition to sliding capability. A slotted member 1104 is provided having a slot 1106, selectively adjustable and held in place with respect to a modified leg 1102 using a bolt 1108 and mating nut (not shown).

Referring back to FIG. 9, the modified display device assembly 908 has means for pivoting the crossbar 920 in relation to the legs 924, which may include a bolt 922 inserted into an aperture in the crossbar and a mating aperture in the leg, the bolt 922 being secured by a nut (not shown). The crossbar 920 may be pivoted in relation to the legs 924 to provide the desired angular position of the display device.

Figure 12:
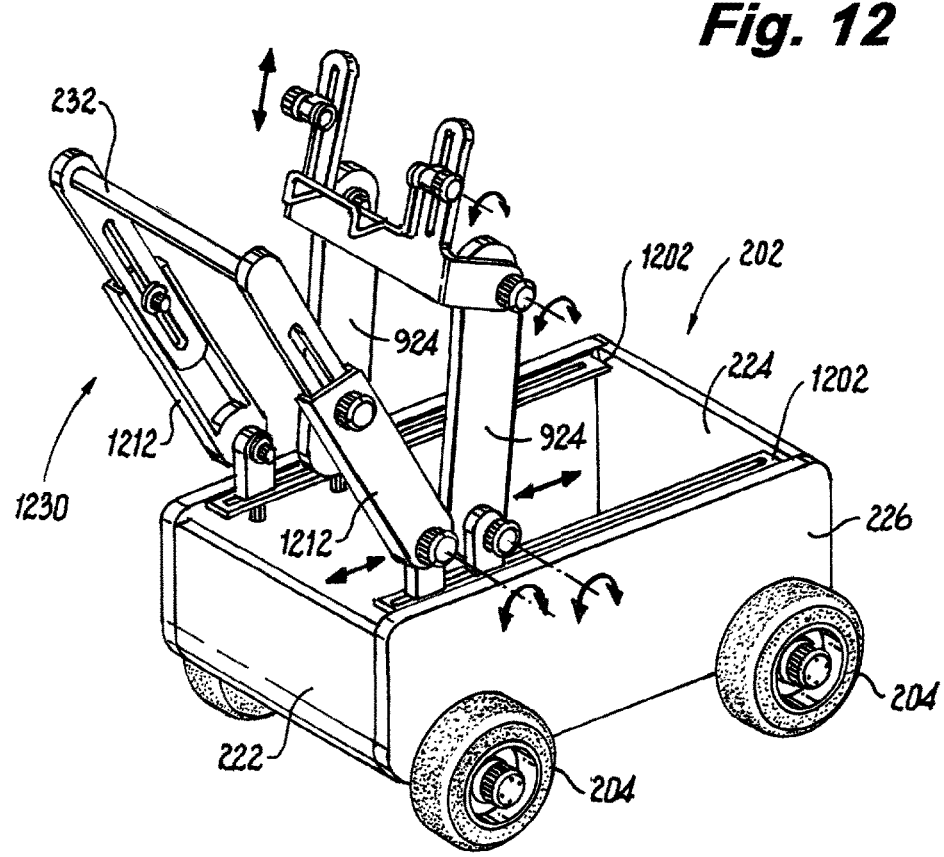
FIG. 12 is a top perspective view of a third embodiment of a toddler walker having independent sliding capability for both the handlebar mount and the tablet mount.

In a third embodiment, as shown in FIG. 12, the toddler walker is similar to the first and second embodiments but has independent sliding capability for both the handlebar assembly and the display device assembly. Thus, as with the first embodiment, the toddler walker includes a body 202 which has a bottom panel (not shown), and a front panel 224, a rear panel 222, and two side panels 226 attached to the bottom panel so as to form an open box-like structure. At least four wheel assemblies 204 are provided, each including a wheel 205 rotatably affixed to the body 202 so that when the wheels 205 rotate the body 202 moves via the wheels along a surface.

Figure 13:
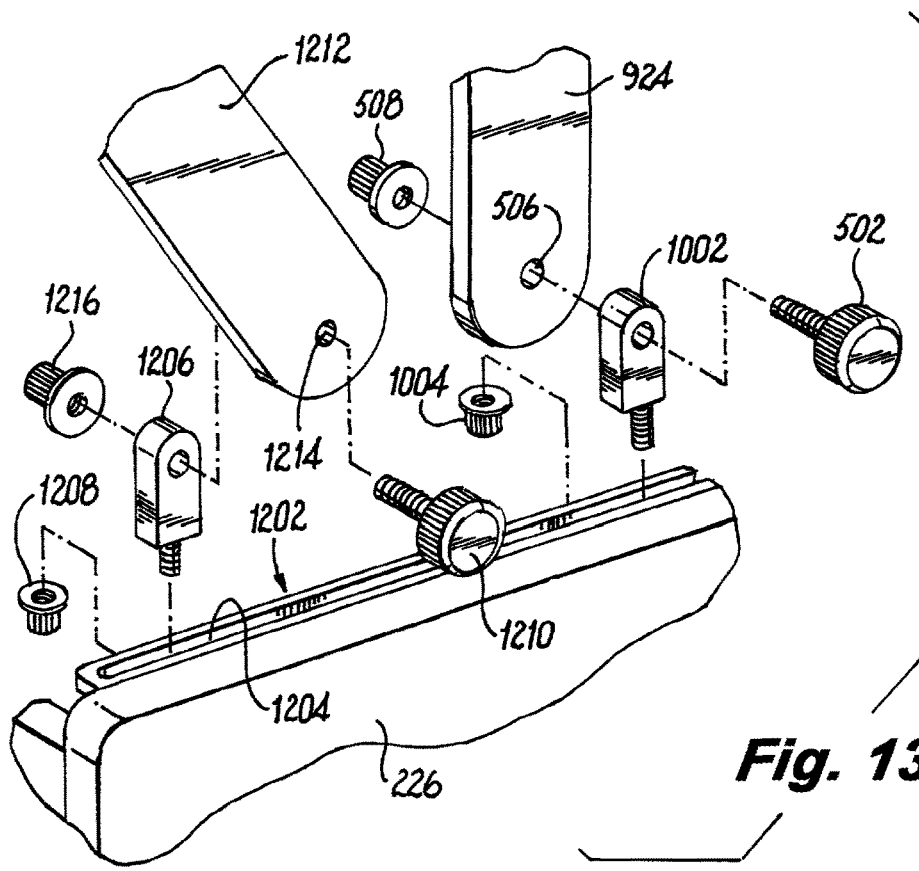
FIG. 13 is a local perspective view of the third embodiment of FIG. 12 with parts separated of the components for both the handlebar mount and the tablet mount.

A modified handlebar assembly 1230 is provided with a handlebar 232 and a pair of modified leg channels 1212 slidingly and pivotally connected to the side panels 226 to enable a toddler to grasp the handlebar 232 when located behind the body and direct movement of the body along the surface. With reference to FIG. 13, each side panel 226 has a slotted rail 1202 with a slot 1204 for receiving therethrough a mount 1206 with a threaded stud, wherein a nut 1208 is threaded onto the threaded stud to secure the mount 1206 where desired along the slotted rail 1202. A pair of legs channels 1212 are pivotally connected to the mounts 1206 with a bolt 1210 having a threaded portion inserted through an aperture 1214 in each leg channel 1212 and a mating aperture in each mount 1206, the threaded portion of the bolt being secured with a nut 1216. Thus, the leg channel 1212 pivots in relation to the mount 1206 (and as described above the mount 1206 slides in relation to the slotted rail 1202).

In this third embodiment, the modified display device assembly is substantially the same as that in the second embodiment described above with respect to FIG. 9, in that it is slidingly connected to the side panels 226 and has means for removably attaching a display device for display to the toddler as they direct movement of the walker along the surface, including means for adjusting the height of the display device. Instead of being located in a (smaller) slotted bracket 1006 as in FIG. 9, the mounts 1002 are located in the longer slotted rail 1202 along with the modified handlebar assembly 1230. With respect to FIG. 13, the slot 1204 in the slotted rail 1202 receives therethrough the mount 1002 with a threaded stud, wherein a nut 1004 is threaded onto the threaded stud to secure the mount 1002 to the slotted bracket Each of the legs 924 is pivotally connected to the mount 1002 with a bolt 502 inserted through an aperture 506 in each leg 924 and a mating aperture in the mount 1002. The bolt 502 is secured with a nut 508 and holds each leg 924 in pivoting relation to the mount 1002. Loosening the nut 508 from the bolt 502 allows the leg 924 to be pivoted in relation to the mount 1002 to a desired angular position and tightening the nut 508 to the bolt 502 retains the leg 924 with respect to the mount 1002.

With respect to all embodiments as described above, the entertainment and attention getting factor provided by the child's favorite video program presentation on the display device including familiar music, characters and learning animation is the key factor in increasing attention and commitment to by the child to working with the device.

What is claimed is:

1. A toddler walker comprising:
    a body comprising a bottom panel, and a front panel, a rear panel, and a pair of side panels attached to the bottom panel so as to form an open box;
    at least four wheel assemblies, each wheel assembly comprising a wheel rotatably affixed to the body so that when the wheels rotate the body moves via the wheels along a surface;
    a handlebar assembly comprising a handlebar, means for adjusting the handlebar to a desired vertical position, and a pair of leg channels pivotally connected to the side panels, to enable a toddler to grasp said handlebar assembly when located behind the body and direct movement of the body along the surface; and a display device assembly pivotally connected to the handlebar assembly, said display device assembly comprising means for removably attaching a display device for display to the toddler as they direct movement of the walker along the surface, said means for removably attaching a display device further comprising means for adjusting the height of the display device.

2. The toddler walker of claim 1 wherein each wheel assembly comprises a hub having a hub recess centered therein, and wherein the wheel of each wheel assembly is rotatably affixed to the body with an axle attached to the side panel, the axle comprising a threaded portion, wherein the wheel is coupled to the axle by inserting the threaded portion of the axle through the hub recess such that the hub rests against a bearing surface of the axle, and further wherein a knob is threaded onto the threaded portion of the axle to maintain the wheel rotatably on the axle.

3. The toddler walker of claim 2 wherein each wheel assembly further comprises means for adjusting the tension of the wheel such that the wheel may be set to require a desired amount of strength to push the walker along the surface.

4. The toddler walker of claim 3 wherein said means for adjusting the tension of the wheel comprises a lock washer inserted onto the threaded portion of the axle between the hub and the knob, the lock washer comprising biasing whereby tightening the knob urges the lock washer against the hub to increase friction against the hub and require increased strength to push the walker along the surface, and wherein said wheel assembly further comprises a label indicating the position of the knob with respect to the wheel.

5. The toddler walker of claim 1 wherein each leg channel of the handlebar assembly is slidingly connected to a slotted member, wherein the handlebar is connected at each end to the slotted members, and wherein the means for adjusting the handlebar to a desired vertical position comprises a bolt inserted through an aperture on the leg channel and a slot in the slotted member, wherein a nut attaches to the bolt to hold the slotted member in sliding relation to the leg channel, wherein loosening the nut from the bolt allows the slotted member to be raised or lowered in relation to the leg channel and tightening the nut to the bolt retains the slotted member with respect to the leg channel.

6. The toddler walker of claim 1 wherein the handlebar assembly is pivotally connected to the side panels with a bolt inserted through an aperture in each leg channel and a mating aperture in the side panel, wherein a nut attaches to each bolt to hold each leg channel in pivoting relation to the side panel, wherein loosening the nut from the bolt allows the leg channel to be pivoted in relation to the side panel to a desired angular position and tightening the nut to the bolt retains the leg channel with respect to the side panel.

7. The toddler walker of claim 1 wherein the handlebar assembly is pivotally connected to the side panels with a bolt inserted through an aperture in the leg channel and threaded into a tapped insert affixed in the side panel, wherein loosening the bolt from the tapped insert allows the leg channel to be pivoted in relation to the side panel to a desired angular position and tightening the bolt to the tapped insert retains the leg channel with respect to the side panel.

8. The toddler walker of claim 1 wherein the display device assembly further comprises a crossbar connected at each end to one of a pair of legs, wherein each of the legs is pivotally connected to the handlebar assembly with a bolt inserted through an aperture in each leg channel of the handlebar assembly and a mating aperture in each leg, wherein a nut attaches to each bolt to hold each leg in pivoting relation to the leg channel, wherein loosening the nut from the bolt allows the leg to be pivoted in relation to the leg channel to a desired angular position and tightening the nut to the bolt retains the leg with respect to leg channel.

9. The toddler walker of claim 1 wherein the means for removably attaching a display device for display to the toddler as they direct movement of the walker along the surface comprises a device bracket for removably holding the display device, the device bracket comprising a pair of threaded device mounts oppositely disposed to removably hold the display device, and a pair of locking knobs, each of the locking knobs threadedly engaging each threaded mount whereby the position of each of the threaded mounts can be selectively adjusted to accommodate differently sized display devices.

10. The toddler walker of claim 9 wherein the means for adjusting the height of the display device comprises a pair of nuts for removably securing each of the threaded mounts to the crossbar through a slotted upright attached to the crossbar, whereby the device bracket may be raised or lowered in relation to the crossbar and the nuts may be used to secure the device bracket in a desired vertical position on the crossbar.

11. A toddler walker comprising:

a body comprising a bottom panel, and a front panel, a rear panel, and a pair of side panels attached to the bottom panel so as to form an open box;

at least four wheel assemblies, each wheel assembly comprising a wheel rotatably affixed to the body so that when the wheels rotate the body moves via the wheels along a surface;

a handlebar assembly comprising a handlebar, means for adjusting the handlebar to a desired vertical position, and a pair of leg channels pivotally connected to the side panels to enable a toddler to grasp said handlebar assembly when located behind the body and direct movement of the body along the surface; and a display device assembly slidingly connected to the side panels, said display device assembly comprising means for removably attaching a display device for display to the toddler as they direct movement of the walker along the surface, said means for removably attaching a display device further comprising means for adjusting the height of the display device.

12. The toddler walker of claim 11 wherein each side panel comprises a slotted bracket comprising a slot for receiving therethrough a mount with a threaded stud, wherein a nut is threaded onto the threaded stud to secure the mount to the slotted bracket, the display device assembly further comprises a crossbar attached at each end to one of a pair of legs, wherein each of the legs is pivotally connected to the side panels with a bolt inserted through an aperture in each leg and a mating aperture in the mount secured to the side panel, the bolt being secured with a nut, and the bolt holds each leg in pivoting relation to the mount, wherein loosening the nut from the bolt allows the leg to be pivoted in relation to the mount to a desired angular position and tightening the nut to the bolt retains the leg with respect to the mount.

13. The toddler walker of claim 12 wherein the display device assembly further comprises means for pivoting the crossbar in relation to the legs.

14. The toddler walker of claim 13 wherein the means for pivoting the crossbar in relation to the legs comprises a bolt inserted into an aperture in the crossbar and a mating aperture in the leg, the bolt being secured by a nut, wherein the crossbar may be pivoted in relation to the legs to provide the desired angular position of the display device.

15. A toddler walker comprising:
- a body comprising a bottom panel, and a front panel, a rear panel, and a pair of side panels attached to the bottom panel so as to form an open box;
- at least four wheel assemblies, each wheel assembly comprising a wheel rotatably affixed to the body so that when the wheels rotate the body moves via the wheels along a surface;
- a handlebar assembly comprising a handlebar, means for adjusting the handlebar to a desired vertical position, and a pair of legs slidingly and pivotally connected to the side panels to enable a toddler to grasp said handlebar assembly when located behind the body and direct movement of the body along the surface; and
- a display device assembly slidingly connected to the side panels, said display device assembly comprising means for removably attaching a display device for display to the toddler as they direct movement of the walker along the surface, said means for removably attaching a display device further comprising means for adjusting the height of the display device.

16. The toddler walker of claim 15 wherein
- each side panel comprises a slotted rail comprising a slot for receiving therethrough a mount with a threaded stud, wherein a nut is threaded onto the threaded stud to secure the mount where desired along the slotted rail; and
- the pair of legs are slidingly and pivotally connected to the side panels with a bolt having a threaded portion inserted through an aperture in each leg and a mating aperture in each mount, the threaded portion of the bolt being secured with a nut;

whereby the leg pivots in relation to the mount and the mount slides in relation to the slotted rail.

* * * * *